United States Patent
Chiou

(10) Patent No.: US 7,263,358 B2
(45) Date of Patent: Aug. 28, 2007

(54) METHOD FOR DETECTING AND REDUCING PING-PONG HANDOVER EFFECT OF CELLULAR NETWORK

(75) Inventor: Ta-Gang Chiou, Taipei (TW)

(73) Assignee: Groundhog Technologies Inc., Cambridge ( * ) Notice: Subject to any disclaimer, the term of this patent is extended or adjusted under 35 U.S.C. 154(b) by 100 days.

(21) Appl. No.: 11/169,961

(22) Filed: Jun. 30, 2005

(65) Prior Publication Data

US 2006/0003768 A1    Jan. 5, 2006

Related U.S. Application Data

(60) Provisional application No. 60/584,498, filed on Jul. 2, 2004.

(51) Int. Cl.
  *H04Q 7/20* (2006.01)
(52) U.S. Cl. .................. 455/436; 455/435.2; 455/438

(58) Field of Classification Search ............. 455/435.1, 455/435.2, 435.3, 436, 438, 439, 440, 441, 455/443, 432.1, 434; 370/331–334
See application file for complete search history.

(56) References Cited

U.S. PATENT DOCUMENTS

| | | | |
|---|---|---|---|
| 6,097,953 A * | 8/2000 | Bonta et al. ................ 455/436 |
| 6,711,408 B1 * | 3/2004 | Raith .......................... 455/440 |
| 2004/0156348 A1 * | 8/2004 | Cheng et al. ............... 370/338 |
| 2004/0267928 A1 * | 12/2004 | Petrus ......................... 709/225 |
| 2005/0048974 A1 * | 3/2005 | Kim et al. .................. 455/436 |

* cited by examiner

*Primary Examiner*—Jean Gelin

(57) ABSTRACT

A method for detecting and reducing ping-pong handover effect of a cellular network is disclosed. The method provides a systematic way to determine which cell pairs of the network have high probability of suffering from the ping-pong handover effect. The method comprises collecting network traffic statistic data of multiple items, wherein each of the items corresponds to a state change of multiple mobile units within cells of the network; determining whether a plurality of criteria are met according to the network traffic statistic data; and detecting the ping-pong effect between the cells according to the result of the determining step. The method also comprises changing a handover parameter for the cells with the ping-pong handover effect.

15 Claims, 2 Drawing Sheets

--- collecting network traffic statistic data of a plurality of items    11 determining whether a set of criteria is met according to the network traffic statistic data    12 detecting the ping-pong handover effect between the cells according to the result of the step 12    13

METHOD FOR DETECTING AND REDUCING PING-PONG HANDOVER EFFECT OF CELLULAR NETWORK

CROSS-REFERENCE TO RELATED APPLICATIONS

The present application claims the benefit of U.S. Provisional Application No. 60/584,498, filed on Jul. 2, 2004, which is herein incorporated by reference.

BACKGROUND OF INVENTION

1. Field of the Invention

The present invention relates in general to mobility management in a wireless communication network, and more particularly to a method for detecting and reducing ping-pong handover effect of a cellular network.

2. Description of the Prior Art

In a cellular network (e.g. the GSM system), the ping-pong handover is a very common phenomenon to degrade the network performance. The ping-pong handover means handover to and fro between a cell pair frequently. The ping-pong effect occurs due to the frequent movement of mobile units between the cell pair, or high signal fluctuation at the common boundary of the cell pair. Since the ping-pong handover increases the times of handover and thus the loading of the network, it is necessary for network operators to reduce this undesirable effect. However, the conventional technology does not provide a systematic and objective solution for the operators to find the cell pair suffering from the ping-pong effect, so it depends on the subjective experience of the operators or the try-and-error way to handle this problem. Usually, this approach would cause inefficiency and failure.

SUMMARY OF INVENTION

It is therefore an object of the present invention to provide a method for detecting ping-pong handover effect of a cellular network, thereby detecting the ping-pong handover effect in a systematic and efficient way.

Another object of the present invention is to provide a method for reducing ping-pong handover effect of a cellular network, thereby reducing the ping-pong handover effect in a systematic and efficient way According to the objects of the present invention, the method for detecting the ping-pong handover effect of the cellular network comprises collecting network traffic statistic data of a plurality of items, wherein each of the items corresponds to a state change of a plurality of mobile units within cells of the cellular network; determining whether a plurality of criteria are met according to the network traffic statistic data; and detecting the ping-pong handover effect between the cells according to the result of the determining step.

In another aspect, the method for reducing the ping-pong handover effect of the cellular network comprises collecting network traffic statistic data of a plurality of items, wherein each of the items corresponds to a state change of a plurality of mobile units within cells of the cellular network; determining whether a plurality of criteria are met according to the network traffic statistic data; detecting the ping-pong handover effect between the cells according to the result of the determining step; and changing a handover parameter for the cells with the ping-pong handover effect.

DETAILED DESCRIPTION

In all embodiments of the present invention, the cellular network can refer to any communication system with a cellular structure, such as GSM, GPRS, UMTS, CDMA, CDMA2000, WiMax, etc. Besides, the concept of handover may be described with different expressions for different types of cellular networks. For examples, handoff is used in CDMA and CDMA2000, while cell update is used in GPRS and UMTS.

Figure 1:
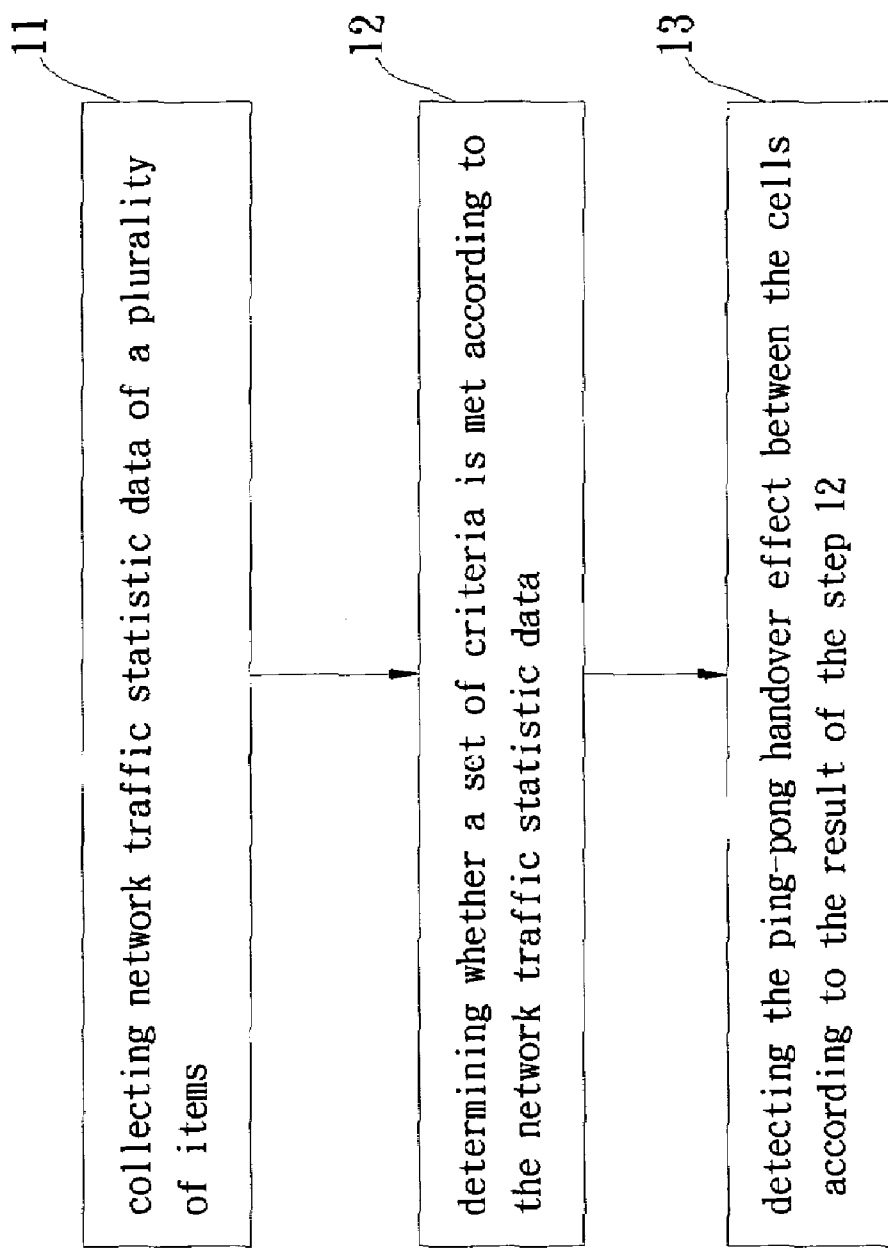
FIG. 1 is a flow chart of a preferred embodiment of the method for detecting ping-pong handover effect within a cellular network according to the present invention.

FIG. 1 is a flow chart of a preferred embodiment of the method for detecting ping-pong handover effect within a cellular network according to the present invention. The cells of the cellular network are grouped into a plurality of location areas. As shown in FIG. 1, the flow comprises the steps of:

11 collecting network traffic statistic data of a plurality of items;

12 determining whether a set of criteria is met according to the network traffic statistic data; and 13 detecting the ping-pong handover effect between the cells according to the result of the step 12.

In the step 11, each of the items corresponds to a state change of a plurality of mobile units (e.g. cellular phones) within the network. The state change means a certain change of the connection between the mobile unit and the network. Furthermore, the network traffic statistical data of the items are generated based on a certain period of time determined by the network equipments. In the step 12, the set of criteria provides a systematic way to determine which cell pairs have high probability of suffering from the ping-pong handover effect. Each of the criteria may involve a comparison between a related parameter, whose value is determined by the network traffic statistical data collected in the step 11, and a corresponding threshold. Then, according to whether the set of criteria is met, the ping-pong effect can be detected efficiently and objectively in the step 13.

Based on the flow of FIG. 1, three more detailed embodiments are described below.

The First Embodiment

In the first embodiment, the step 11 collects the below items: (1) Directional handover between each cell pair. (2) Location area update of each cell. (3) Mobile terminating call (MTC) and mobile originating call (MOC) within each cell. Directional handover means the times of the connection between the network and the mobile unit changing from via a source cell to via a neighboring destination cell. Location area update (LAU) of a cell means the times of the mobile units moving to the cell from its neighboring cells belonging to other different location areas. In a network unable to collect the item of LAU, a more general but less accurate item of location update (LU) is collected. MTC represents the times of the mobile units within a cell receiving calls, and MOC represents the times of the mobile units calling out. There is usually a proportional relation between the MTC and MOC of the cell.

In the step 12, the set of criteria as described below can be applied to any cell pair (e.g. $CELL_i$ and $CELL_j$) of the network:

(1-1) The directional handover from $CELL_i$ to $CELL_j$ (denoted by $HO_{ij}$) is higher than a threshold $TH_2$. This criterion means that a cell pair with a relatively low directional handover is not taken into consideration.

(1-2) A parameter $P1_{ij}$ is higher than a threshold $TH_1$. Here $P1_{ij}$ is defined by a ratio between $HO_{ij}$ and the sum of MTC and MOC within $CELL_i$ (denoted by $MTC_i$ and $MOC_i$ respectively). That is, $$P1_{ij}=HO_{ij}/(MTC_i+MOC_i) \qquad \text{Eq. (1)}$$

Another workable version of $P1_{ij}$ is defined by a ratio between $HO_{ij}$ and the sum of MTC and MOC within $CELL_j$. This varied version can also work since it brings a result similar to Eq. (1). That is, $$P1_{ij}=HO_{ij}/(MTC_j+MOC_j)$$

A high $P1_{ij}$ represents that a significantly higher directional handover is generated based on the same quantity of the mobile units on the phone, that is, the ping-pong handover effect is probable to exist between $CELL_i$ and $CELL_j$.

(1-3) A parameter $P2_{ij}$ is higher than a threshold $TH_3$. Here $P2_{ij}$ is defined by a ratio of the times of signal movement from $CELL_i$ to $CELL_j$ in active mode to those in idle mode. The signal movement from $CELL_i$ to $CELL_j$ means that a mobile unit moves from $CELL_i$ to $CELL_j$, or the medium via which the mobile unit connects with the network is changed from $CELL_i$ to $CELL_j$. The active mode means that the mobile unit is accessing the network for voice or data service, and the idle mode means that the mobile unit is not in the active mode while still connecting to the network.

In this criterion, we can interpret the signal movement from $CELL_i$ to $CELL_j$ in active mode as $HO_{ij}$. Thus, a high $P2_{ij}$ represents that a significantly larger portion of the moving mobile units from $CELL_i$ to $CELL_j$ is in the active mode (e.g. on the phone), that is, the ping-pong handover effect is probable to exist between $CELL_i$ and $CELL_j$.

If $CELL_j$ is a border cell of a location area, then $P2_{ij}$ is equivalently determined by a ratio of the sum of all $HO_{kj}$ to LAU of $CELL_j$ (denoted by $LAU_j$), that is, $$P2_{ij} = \sum_k HO_{kj}/LAU_j$$

wherein each $CELL_k$ is a neighboring cell of $CELL_j$ and belongs to a location area different from that of $CELL_j$.

If $CELL_j$ is an inner cell (i.e. not a border cell), then $P2_{ij}$ is equivalently determined by all $P2_{kj}$, where $CELL_k$ is a neighboring cell of $CELL_j$. With regard to the way of determination, please refer to the part of $A_i$ calculation in the U.S. patent application "SYSTEM FOR CONSTRUCTING A MOBILITY MODEL FOR USE IN MOBILITY MANAGEMENT IN A WIRELESS COMMUNICATION SYSTEM AND METHOD THEREOF" (filed on Feb. 21, 2003 with Ser. No. 10/369,678), which is incorporated herein by reference.

(1-4) If the pair of $CELL_i$ and $CELL_j$ has the ping-pong handover effect, $HO_{ij}$, $P1_{ij}$, and $P2_{ij}$ used in the criteria (1-1)-(1-3) should be symmetric to $HO_{ji}$, $P1_{ji}$, and $P2_{ji}$ respectively. $HO_{ji}$ is the directional handover from $CELL_j$ to $CELL_i$. $P1_{ji}$ is a reverse parameter of $P_{ij}$ and defined by the ratio of $HO_{ji}$ to the sum of $MTC_j$ and $MOC_j$. $P2_{ji}$ is a reverse parameter of $P2_{ij}$ and defined by the ratio of the times of signal movement from $CELL_j$ to $CELL_i$ in active mode to those in idle mode. This criterion is straightforward since the ping-pong handover means "two-way" handover. In this embodiment, it is notable that a range of difference (e.g. 10%-15%) between two parameters is allowable for these two parameters to be symmetric.

If the criteria (1-1) to (1-4) are met for the pair of $CELL_i$ and $CELL_j$ according to the collected statistical data, then in the step 13, the cell pair can be judged to have a high probability of ping-pong handover effect. By adjusting the thresholds used in the criteria (1-1) to (1-3), we can change the degree of strictness in these criteria. For example, if these thresholds are adjusted higher, the cell pair with more serious ping-pong effect will be detected.

In a varied version of the first embodiment, the weight of the criteria (1-1) to (1-3) is considered. There are two ways to execute the step 13 of FIG. 1:

(1) For each of the criteria (1-1) to (1-3), a rank list of all the qualified cell pairs is first generated according to the value of the related parameter. For example, for the criterion (1-1), the qualified cell pairs are ranked according to their $HO_{ij}$ values. Next, a respective weighting score is given to each qualified cell pair according to its position in the respective rank list of the criteria (1-1) to (1-3). The weighting score for the same position of the rank list may be different for different criteria. Then, the sum of all the weighting scores for each qualified cell pair is calculated, and we can compare the sum with a threshold to decide whether the qualified cell pair has the ping-pong handover effect.

(2) For each of the criteria (1-1) to (1-3), the related parameter of each qualified cell pair is first multiplied with a weighting coefficient to generate a weighting score. The weighting coefficient for different criteria may be different. Next, the sum of all the weighting scores for each qualified cell pair is calculated. Finally, we can compare the sum with a threshold to decide whether the qualified cell pair has the ping-pong handover effect.

The Second Embodiment

The second embodiment is applied to the network in which the statistical data of handover is non-directional. The non-directional handover of $CELL_j$ (denoted by $HO_j$) means the times of the connection between the network and the mobile unit changing from via any neighboring cell of $CELL_j$ to via $CELL_j$, without differentiating the source cell. Thus, in the second embodiment, the items collected in the step 11 include: (1) non-directional handover of each cell. (2) MTC and MOC within each cell.

In the step 12, the set of criteria as described below is applied to each cell (e.g. $CELL_j$):

(2-1) $HO_j$ is higher than a threshold $TH_4$.

(2-2) A parameter P3 is higher than a threshold $TH_5$. P3 is defined by a ratio between $HO_j$ and the sum of MTC and MOC within $CELL_j$. That is, $$P3=HO_j/(MTC_j+MOC_j).$$

If the criteria (2-1) and (2-2) are met for $CELL_j$ according to the collected statistical data, the step 13 can only determine that there is a high probability of the ping-pong effect to exist between $CELL_j$ and one or more neighboring cells of $CELL_j$, since the related parameters of the criteria (2-1) and (2-2) are non-directional. Similarly, the degree of strictness in the criteria (2-1) and (2-2) can be changed by adjusting the thresholds used in these criteria.

The Third Embodiment

The third embodiment is applied to the network in which the statistical data of handover back can be collected. The handover back means the times of backward handover occurring within a preset period of time after forward handover. The notation of $HO_{ij}$_back is used to represent the handover back of $HO_{ij}$. In the third embodiment, the items collected in the step 11 include: (1) Directional handover between each cell pair. (2) Handover back between each cell pair.

In the step 12, the set of criteria as described below is applied to each cell pair (e.g. $CELL_i$ and $CELL_j$):

(3-1) A parameter P4 defined by a ratio of $HO_{ij}$_back to $HO_{ij}$ is higher than a threshold $TH_6$.

(3-2) $HO_{ij}$_back is higher than a threshold $TH_7$. This criterion means that a cell pair with a relatively low handover back is not taken into consideration.

If the criteria (3-1) and (3-2) are met for the pair of $CELL_i$ and $CELL_j$ according to the collected statistical data, then the cell pair can be judged to have a very high probability of the ping-pong handover effect in the step 13. Similarly, the degree of strictness in the criteria (3-1) and (3-2) can be changed by adjusting the thresholds used in these criteria.

There is an assisting criterion in the step 12 for helping to detect the cell pair with the ping-pong effect. The assisting criterion is that if the environment of a cell causes signal fluctuation higher than a level (e.g. an allowable or average level of the network), then the cell is more probable to suffer from the ping-pong effect than other cells. This assisting criterion can be applied to the first to third embodiments mentioned above.

Figure 2:
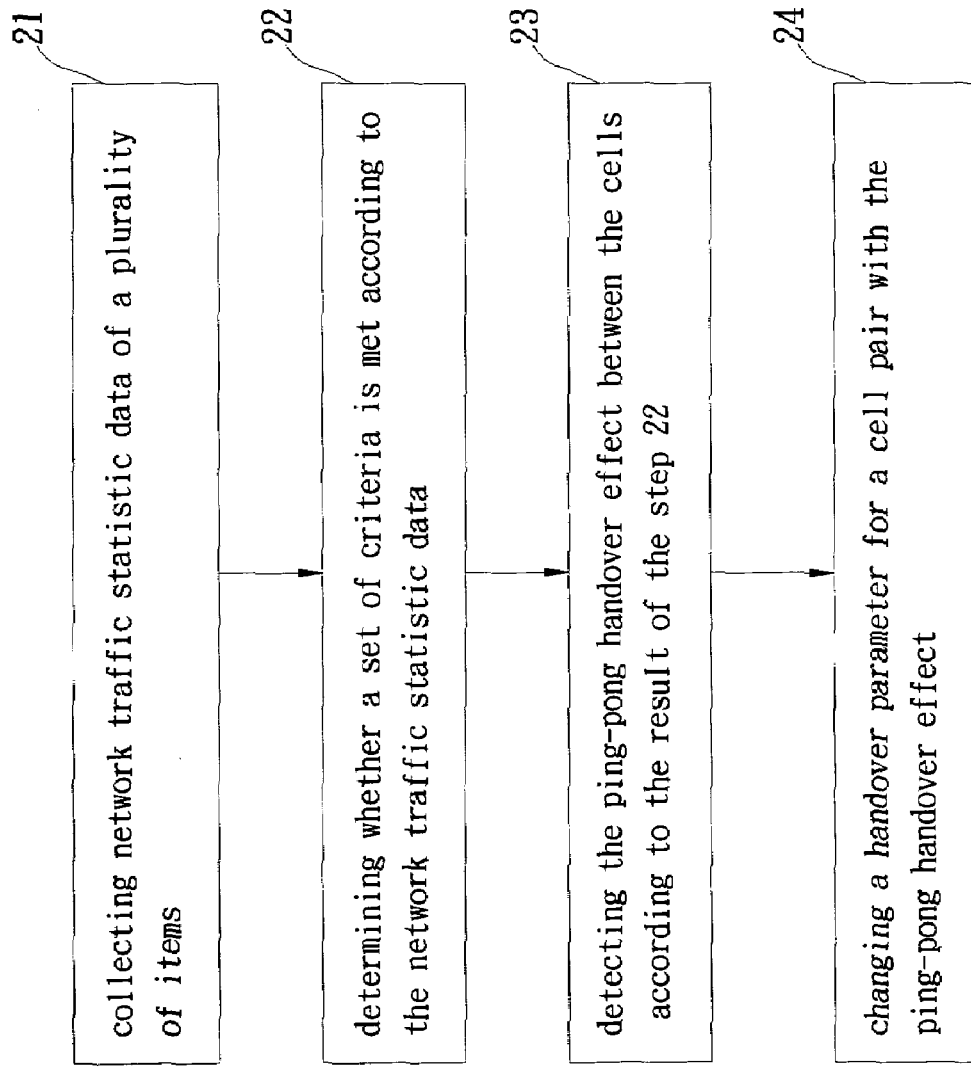
FIG. 2 is a flow chart of a preferred embodiment of the method for reducing the ping-pong handover effect within the cellular network according to the present invention.

FIG. 2 is a flow chart of a preferred embodiment of the method for reducing the ping-pong handover effect within the cellular network according to the present invention. As shown in FIG. 2, the flow comprises the steps of:

21 collecting network traffic statistic data of a plurality of items;

22 determining whether a set of criteria is met according to the network traffic statistic data;

23 detecting the ping-pong handover effect between the cells according to the result of the step 22; and

24 changing a handover parameter for a cell pair with the ping-pong handover effect.

The steps 21 to 23 are similar to the steps 11 to 13 in FIG. 1. Thus, all the embodiments based on FIG. 1 can also be applied to the flow of FIG. 2 and would not be described again here. In the step 24, the handover parameter includes handover hysteresis, handover window timer or both. If a cell pair of $CELL_i$ and $CELL_j$ is detected as with the ping-pong effect in the step 23, then the handover hysteresis or handover window timer from $CELL_i$ to $CELL_j$ (or from $CELL_j$ to $CELL_i$) are increased to reduce $HO_{ij}$ (or $HO_{ji}$) in the step 24, thereby reducing the ping-pong effect between $CELL_i$ and $CELL_j$. However, in the preferred embodiment of FIG. 2, the change of handover parameter in the step 24 must not cause negative effect on the wireless communication network. For example, if the handover parameter is adjusted higher than an allowable threshold, the network performance will be lowered since the signal quality of mobile units may be damaged without necessary handover. Another example of negative effect is that the change of the handover parameter may push the handover to another neighboring cell which is already overloaded.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A method for detecting ping-pong handover effect of a cellular network, comprising:

collecting network traffic statistic data of a plurality of items, wherein each of the items corresponds to a state change of a plurality of mobile units within cells of the cellular network, wherein the items include handover between a first cell and a second cell of the cells and at least one of mobile terminating call (MTC) and mobile originating call (MOC) within the first and second cells;

determining whether a plurality of criteria are met according to the network traffic statistic data; and detecting the ping-pong handover effect between the cells according to a result of the determining step;

wherein the criteria comprise comparing a first parameter with a first threshold and comparing the handover from the first cell to the second cell with a second threshold, wherein the first parameter is defined according to the handover from the first cell to the second cell and at least one of the MTC and MOC within one of the first and second cells;

wherein the criteria further comprise the handover from the first cell to the second cell is symmetric to that from the second cell to the first cell, and the first parameter is symmetric to a first reverse parameter defined according to the handover from the second cell to the first cell and at least one of the MTC and MOC within one of the first and second cells.

2. The method according to claim 1, wherein the criteria comprise comparing signal fluctuation caused by environment of the cells with a level.

3. The method according to claim 1, wherein each of the criteria has a related parameter which has a corresponding value for each of a plurality of cell pairs, wherein the corresponding value is determined according to the network traffic statistic data.

4. The method according to claim 3, wherein the detecting step comprises:

generating a weighting score for each qualified cell pair of each of the criteria according to the corresponding value of the qualified cell pair;

comparing a sum of the weighting scores of each qualified cell pair with a threshold; and deciding whether the qualified cell pair has the ping-pong handover effect according to a result of the comparing step.

5. The method according to claim 1, wherein the cells of the cellular network are grouped into a plurality of location areas, and the items further include location area update of each cell and handover between the cells.

6. The method according to claim 5, wherein the criteria comprise comparing a second parameter with a third threshold, wherein the second parameter is defined according to signal movements from the first cell to the second cell in active mode and in idle mode.

7. The method according to claim 6, wherein the criteria further comprise the second parameter is symmetric to a second reverse parameter defined according to signal movements from the second cell to the first cell in active mode and in idle mode.

8. A method for detecting ping-pong handover effect of a cellular network, comprising:
collecting network traffic statistic data of a plurality of items, wherein each of the items corresponds to a state change of a plurality of mobile units within cells of the cellular network;
determining whether a plurality of criteria are met according to the network traffic statistic data; and
detecting the ping-pong handover effect between the cells according to a result of the determining step;
wherein the items include non-directional handover between a first cell and neighboring cells thereof, and at least one of MTC and MOC within the first cell;
wherein the criteria comprise: (1) comparing the non-directional handover with a fourth threshold; and (2) comparing a third parameter with a fifth threshold, wherein the third parameter is defined according to the non-directional handover and at least one of the MTC and MOC within the first cell.

9. The method according to claim 8, wherein each of the criteria has a related parameter which has a corresponding value for each of a plurality of cell pairs, wherein the corresponding value is determined according to the network traffic statistic data.

10. The method according to claim 9, wherein the detecting step comprises:
generating a weighting score for each qualified cell pair of each of the criteria according to the corresponding value of the qualified cell pair;
comparing a sum of the weighting scores of each qualified cell pair with a threshold; and
deciding whether the qualified cell pair has the ping-pong handover effect according to a result of the comparing step.

11. A method for detecting ping-pong handover effect of a cellular network, comprising:
collecting network traffic statistic data of a plurality of items, wherein each of the items corresponds to a state change of a plurality of mobile units within cells of the cellular network, wherein the items include handover between a first cell and a second cell of the cells and handover back between the first and second cells;
determining whether a plurality of criteria are met according to the network traffic statistic data; and
detecting the ping-pong handover effect between the cells according to a result of the determining step;
wherein the criteria comprise comparing a fourth parameter with a seventh threshold, wherein the fourth parameter is defined according to the handover and the handover back between the first and second cells.

12. The method according to claim 11, wherein the criteria comprise comparing the handover back between the first and second cells with a sixth threshold.

13. The method according to claim 11, wherein the criteria comprise comparing signal fluctuation caused by environment of the cells with a level.

14. The method according to claim 11, wherein each of the criteria has a related parameter which has a corresponding value for each of a plurality of cell pairs, wherein the corresponding value is determined according to the network traffic statistic data.

15. The method according to claim 14, wherein the detecting step comprises:
generating a weighting score for each qualified cell pair of each of the criteria according to the corresponding value of the qualified cell pair;
comparing a sum of the weighting scores of each qualified cell pair with a threshold; and
deciding whether the qualified cell pair has the ping-pong handover effect according to a result of the comparing step.

* * * * *